June 14, 1960 J. F. HARVEY 2,940,734
BANDED PRESSURE VESSELS
Filed Dec. 16, 1957

INVENTOR.
John F. Harvey
BY
J. F. Moran
ATTORNEY

[US Patent 2,940,734 — Patented June 14, 1960]

2,940,734
BANDED PRESSURE VESSELS

John F. Harvey, Akron, Ohio, assignor to The Babcock & Wilcox Company, New York, N.Y., a corporation of New Jersey Filed Dec. 16, 1957, Ser. No. 702,948

3 Claims. (Cl. 257—208)

This invention relates to a banded pressure vessel construction, i.e. a vessel having an inner shell about which is superposed circumferential reinforcing band or bands under tension, and more particularly to banded pressure vessels provided with auxiliary, independent, forced heating means disposed between the inner shell and reinforcing bands, and adapted to receive in operation a high temperature fluid charge.

In certain industrial processes performed under conditions of high pressures, the utilization of banded pressure vessels as autoclaves or reactors for either continuously or intermittently containing a high temperature fluid is oftentimes desirable. However, when the source of heat addition to the walls in such vessels is due solely to the heat transmitted from the internal charge an undesirable temperature variation or gradient occurs across the wall of the vessel between the outermost band lamina and the inner face of the innner shell. This condition is aggravated when the vessel is subjected to processes requiring periodic or intermittent introduction and discharge of high temperature and pressure fluid charges or reactants that result in alternately heating and cooling the walls of the vessel. This causes a cyclical variation in the temperature gradient across the vessel wall, which if not modulated, will have a deleterious effect thereon. Consequently, the maximum advantages and economy of banded vessel constructions, when utilized in such processes, is not fully realized.

According to this invention the advantages of the banded vessel construction, when utilized as autoclaves and reactors or the like, are attained when the temperature gradients or variations thereof which occur between the inner and outer wall surfaces of the vessel are minimized. The present invention is directed to a banded pressure vessel construction having a built-in heating means in the walls thereof to supplement or modulate the heating and/or cooling cycle of a particular process and thereby effectively maintain the outer bands at temperatures close to that of the innner shell throughout the operating cycle of the process involved. The internal heating of the composite wall structure of a banded vessel according to this invention tends to simulate inside heating to minimize the temperature gradient or any variation thereof which would otherwise exist across the wall of the vessel.

An object of this invention in relation to banded pressure vessels of the character described is to provide a construction which will permit the rapid heating or preheating of the shell and reinforcing bands with a minimum metal temperature variation thereacross in going to and from a non-operating to full operating condition, thereby reducing the time required for starting up.

Another object is to provide an improved forced, auxiliary heated, banded vessel construction whereby optimum contact between the inner shell and adjacent reinforcing band is assured so that in the range between operating and non-operating condition the band is subjected to uniform stresses.

More specifically the objects and allied advantages of the improved banded vessel construction of this invention are attained by providing an inner shell with circumferentially extending grooves and lands formed in the exterior surface thereof and about which superposed reinforcing band or bands are disposed. Independent, non-contaminating, heating elements formed as coils or rings are disposed in grooves for imparting heat to the shell and bands. The lands between the grooves serve to space the coils or rings of the heating means and at the same time maintain the circular arrangement or contour of the shell to provide an optimum contact surface for the superposed band thereon. Thus the lands are subjected to radial stresses only when heated and consequently induces a uniform stress in the bands in contact therewith.

A feature of this invention resides in the provision of utilizing a non-contaminating, independently controlled, heating means disposed within the walls of a banded pressure vessel in a manner so as to avoid undetectable stress corrosion or embrittlement of the shell and bands.

Another feature of this invention resides in the avoidance of excessive temperature gradients or variations thereof between the wall components of a composite banded pressure vessel with a corresponding improvement in the stress characteristics of the vessel.

Still another feature of this invention resides in the provision that the pressure vessel is relatively simple in construction, economic to manufacture, and positive in operation.

Other features and advantages will be readily apparent when considered in view of the drawings and the following description in which.

Figure 1:
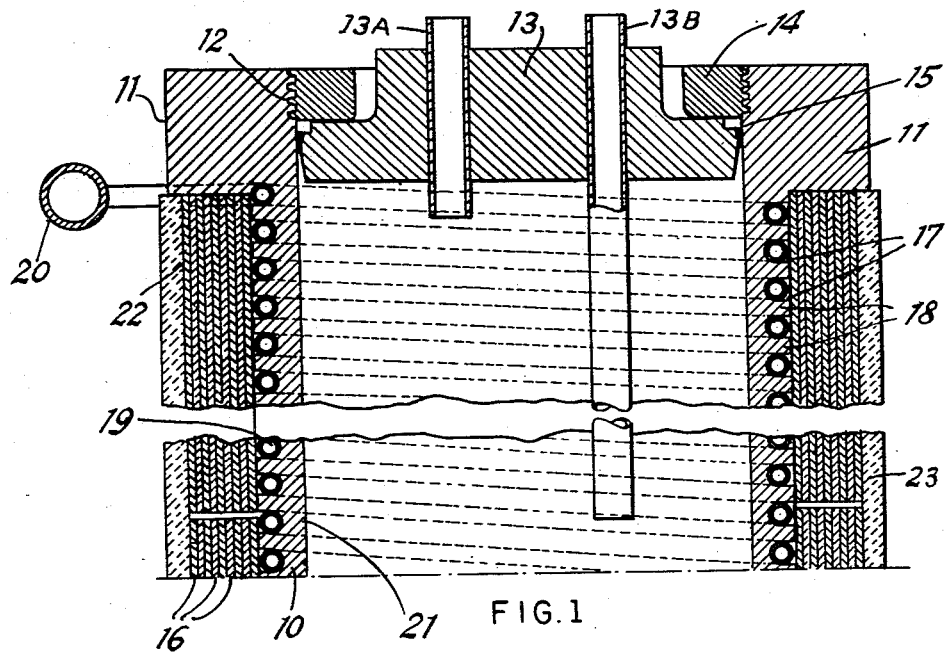
Fig. 1 is a fragmentary sectional view of an improved, forced heated, banded, full open end, pressure vessel according to this invention.

Referring to Fig. 1, the improved forced heated vessel according to this invention comprises generally an elongated cylindrical inner body or shell 10, full open at one end and closed at the other end by suitable means, usually by hemispherical end (not shown), the thickness of the shell being generally determined by the wall thickness of the metal plate required to withstand the pressure exerted on the closed hemispherical end. In the illustrated form the open end of the shell is reinforced by a thickened flanged portion 11 having an internal threaded section 12. A removable cover 13 closes the open end of the vessel and is held in position by a sealing ring 14 externally threaded to mate with the internal threads 12 of the flange 11; a sealing gasket means 15 being disposed between the cover 13 and the ring 14. Inlet and outlet conduits 13A and 13B, respectively, may be provided in the cover to provide means for charging and discharging the vessel with a high temperature fluid charge or reactant.

As the shell is intended to be subjected to great pressures, which are oftentimes incurred in certain industrial processes as for example in the chemical arts, concentric bands 16 are disposed about shell 10 for reinforcing the shell against the involved pressures, the banded vessel construction and the method of making the same being generally that as disclosed in U.S. Patents 2,376,351 and 2,585,237.

According to this invention the circumferential outer surface of the shell 10 is provided with encircling grooves 17 and lands 18, arranged in a configuration to form either a single or multiple heat flow path. In the illustrated embodiment a single relatively close pitched helical groove is formed in the outer surface of the shell. Thus the intergroove lands 18 of the closely pitched helical groove tend to contribute to the hoop strength of the inner shell.

Auxiliary heating of the shell to a temperature of the order of 650° F. is accomplished by imparting heat to the shell within the helical groove. While suitable electrical heating coils may be utilized for imparting heat to the vessel within the grooves, in the illustrated embodiment, there is shown a tubular coil 19 through which a heating fluid, such as superheated steam or the like is circulated. As shown the heating coil 19 is disposed within the grooves 17 in heat transfer relationship with the shell and the adjacent band. One end of the coil connects to a manifold 20 which receives the heating fluid from a suitable source and the other end of the coil (not shown) discharges the heating fluid which has traversed the helical flow path. With the heating fluid or steam in contact with the coil, which is preferably formed of a non-corrosive material, undetectable corrosion of the highly stressed shell beneath the band is avoided. It will be noted that with the instant non-contaminating type of heating means, whether it be an electric heater or a fluid containing heating tubes disposed in the grooves, the problem of maintaining fluid tightness of the grooves is avoided. Thus the edge welding for purposes of sealing is not necessary.

Another important feature of the instant invention from a stress standpoint is that the helical lands 18 circumscribing the wall of inner shell 10 throughout its length preserve the circular and cylindrical arrangement of the shell 10 and forms an optimum contact surface for the bands 16 surrounding the shell. Thus upon thermal expansion of the shell 10 which is radially outwardly, the force exerted thereby is uniformly distributed through the lands 18 to the bands 16.

It will be noted further that as the bands 16 are shrunk into place on the shell, advantageous distribution of the stresses between inner shell and the reinforcing bands is had. Consequently, if the bands were in any way excessively heated by an external application of heat, there would be a tendency to eliminate the prestressing due to the original assembly. Thus if the initial prestressing condition is lost due to excessive exterior heating, some of the economy of the thin banded vessel assembly is lost. Therefore, according to this invention by simulating inside heating, i.e. introducing heat intermediate the composite radial thickness of the wall between the inner shell and the innermost band, the initial desirable stress conditions are maintained when the vessel is in operation.

The forming of the helical groove and lands in the surface of the shell is economically accomplished by simple turning of the same, as for example by a lathe, and the utilization of a relatively thin shell 10 reinforced by thin ring bands 16 further reduces the cost thereof over that of a comparable pressure vessel formed from a metal plate of a single, greater thickness.

Figure 2:
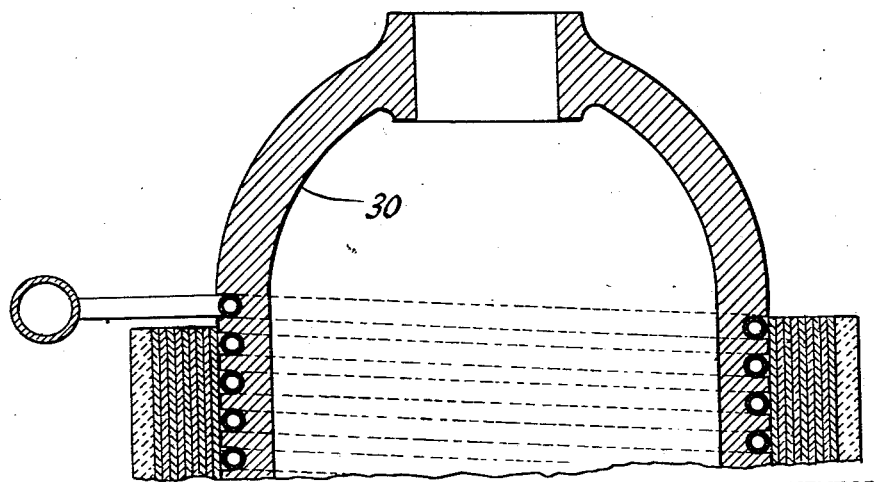
Fig. 2 illustrates an application of the instant invention to a modified form of vessel shown in section.

Fig. 2 illustrates the application of the instant invention to a vessel 30 having a hemispherical end and which in all other respects is comparable to the foregoing described structure.

Thus it will be noted that by arranging auxiliary heating means between the innermost and outermost surfaces 21 and 22 respectively of the vessel and causing the heat to be transmitted inwardly and outwardly simultaneously, the lapse time for bringing the vessel up to required operating temperature is reduced. Further, any undesirable temperature gradient between the inner and outer surfaces 21 and 22 is reduced to a minimum.

As reactors and autoclave vessels are generally cylindrical and usually positioned in an upright position, the helical heating element 19 further provides a relatively long heating fluid flow path which at the same time renders it readily drainable. If desired a layer of insulating material 23 may be provided around the bands.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:

1. A pressure vessel comprising a shell for containing a material under pressure and having encircling grooves in the exterior surface thereof, means for imparting heat to said shell within said grooves, and reinforcing bands superposed about the exterior surface of said shell to simulate a thick wall vessel capable of withstanding said pressure, said heating means modulating the heating of said simulated thick wall vessel to minimize the temperature gradient and thermal stresses across said thick wall so that said bands are maintained in contact with one another throughout an operating cycle.

2. A pressure vessel for containing a material under pressure comprising a shell incapable of withstanding said pressure, said shell having encircling grooves in the exterior surface thereof, and a plurality of superposed reinforcing bands disposed about the exterior surface of said shell to simulate a thick wall vessel capable of withstanding said pressure, and a conduit disposed in said grooves for receiving a fluid flow therethrough in heat exchange relationship to said shell and reinforcing bands to modulate heating or cooling of said simulated thick wall vessel and thereby minimize the temperature gradient and thermal stresses occurring between the inner surface of said shell and the outer surface of the outermost reinforcing band so that said bands are maintained in contact with one another throughout an operating cycle.

3. A force heated pressure vessel comprising a cylindrical inner shell for containing a material under pressure and having circumferential lands and grooves formed in the exterior surface thereof, a conduit imbedded in said grooves, and a plurality of concentric superposed reinforcing bands surrounding the exterior surface of said shell to simulate a thick wall vessel for withstanding said pressure, said lands forming the contact surface between the innermost band and said shell for maintaining the circular arrangement of said shell, and said conduit being adapted to receive a fluid flow therethrough in heat exchange relationship with said shell and reinforcing bands to modulate the heating or cooling of said simulated thick wall vessel and thereby minimize the temperature gradient and thermal stresses across the thick wall so that said reinforcing bands are maintained in contact with one another throughout an operating cycle.

References Cited in the file of this patent

UNITED STATES PATENTS

| | | |
|---|---|---|
| 484,784 | Emmens | Oct. 25, 1892 |
| 760,784 | Fournier | May 24, 1904 |
| 1,732,235 | Joyce | Oct. 22, 1929 |
| 2,268,961 | Raymond et al. | Jan. 6, 1942 |
| 2,356,779 | Morrison | Aug. 29, 1944 |
| 2,480,369 | Jasper | Aug. 30, 1949 |
| 2,625,804 | Patch et al. | Jan. 20, 1953 |

FOREIGN PATENTS

| | | |
|---|---|---|
| 689,126 | Great Britain | Mar. 18, 1953 |